(12) United States Patent
Gane et al.

(10) Patent No.: US 9,365,723 B2
(45) Date of Patent: Jun. 14, 2016

(54) PROCESS FOR PREPARING SELF-BINDING PIGMENT PARTICLES

(75) Inventors: Patrick A. C. Gane, Rothrist (CH); Matthias Buri, Rothrist (CH); Samuel Rentsch, Aarburg (CH); Julie Bridy, Wunnewil (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 14/005,940

(22) PCT Filed: Mar. 22, 2012

(86) PCT No.: PCT/EP2012/055053
§ 371 (c)(1),
(2), (4) Date: Dec. 23, 2013

(87) PCT Pub. No.: WO2012/130702
PCT Pub. Date: Oct. 4, 2012

(65) Prior Publication Data
US 2014/0165879 A1     Jun. 19, 2014

Related U.S. Application Data

(60) Provisional application No. 61/473,215, filed on Apr. 8, 2011.

(30) Foreign Application Priority Data

Apr. 1, 2011   (EP) .................................... 11160900

(51) Int. Cl.
| | | |
|---|---|---|
| C09C 1/02 | (2006.01) | |
| D21H 17/00 | (2006.01) | |
| D21H 17/26 | (2006.01) | |
| D21H 17/69 | (2006.01) | |

(52) U.S. Cl.
CPC ............... *C09C 1/021* (2013.01); *D21H 17/00* (2013.01); *D21H 17/26* (2013.01); *D21H 17/69* (2013.01); *C01P 2004/62* (2013.01); *C01P 2006/22* (2013.01); *C01P 2006/60* (2013.01)

(58) Field of Classification Search
CPC ...... C09C 1/021; C09C 1/009; C09C 1/0093; C01P 2004/62; C01P 2006/22; C01P 2006/60; D21H 17/00; D21H 17/26; D21H 17/69
USPC .................. 106/465, 501.1; 162/139, 162
See application file for complete search history.

(56) References Cited

U.S. PATENT DOCUMENTS

| | | | |
|---|---|---|---|
| 3,728,331 A | 4/1973 | Savage | |
| 5,061,346 A | 10/1991 | Taggart et al. | |
| 5,241,009 A | 8/1993 | Yarbrough et al. | |
| 5,354,424 A | 10/1994 | Rha et al. | |
| 5,708,162 A | 1/1998 | Hilbig et al. | |
| 6,057,398 A | 5/2000 | Blum | |
| 2007/0240619 A1 | 10/2007 | Munchow | |
| 2007/0266898 A1 | 11/2007 | Gane et al. | |
| 2008/0210394 A1 | 9/2008 | Mahr et al. | |
| 2010/0120948 A1 | 5/2010 | Gane et al. | |
| 2012/0016061 A1* | 1/2012 | Gane et al. ........................ 524/4 |
| 2014/0165877 A1* | 6/2014 | Gane et al. ................. 106/217.9 |
| 2014/0165879 A1 | 6/2014 | Gane et al. | |
| 2015/0105260 A1 | 4/2015 | Gantenbein et al. | |

FOREIGN PATENT DOCUMENTS

| | | |
|---|---|---|
| DE | 1543116 | 7/1969 |
| DE | 4411681 A1 | 10/1995 |
| EP | 0056360 | 7/1982 |
| EP | 250614 A1 | 10/2012 |
| GB | 1139637 | 1/1969 |
| JP | 2001064407 A | 3/2001 |
| JP | 2004043548 | 2/2004 |
| RU | 940411190 | 9/1996 |
| RU | 2531183 A | 10/2014 |
| WO | 9843595 A1 | 10/1998 |
| WO | 2005111153 A1 | 11/2005 |
| WO | 2006008657 A2 | 1/2006 |
| WO | 2006128814 A1 | 12/2006 |
| WO | 2008139292 A1 | 11/2008 |
| WO | 2010107512 A1 | 9/2010 |

OTHER PUBLICATIONS

International Search Report dated May 2, 2012 for PCT Application No. PCT/EP2012/055053.
Written Opinion of the International Searching Authority dated May 2, 2012 for PCT Application No. PCT/EP2012/055053.
English Translation of Office Action for Russian Application No. 2013148746.
English Translation of Office Action dated Feb. 2, 2015 for Korean Application No. 10-2013-7028788.
Notice of Opposition dated Aug. 14, 2014 for European European Patent No. 2 505 614.
Aqualon—Sodium Carboxymethylcellulose, Physical and Chemical Properties, (1999) p. 1 to 32.
Römpp-Lexikon der Chemie Publisher Jürgen Falbe Manfred Regitz, (1996) p. 611-612.
Römpp-Lexikon der Chemie Publisher Jürgen Falbe Manfred Regitz, (1997) p. 1313-1814.
Barba et al. "Synthesis and characterization of carboxymethylcelluloses from non-wood pulps II. Rheological behavior of CMC in aqueous solution." Cellulose 9:327-335, 2002.
Bos et al., Das Papierbuch Handbuch der Papierherstellung, (1999) p. 362-388.
Lehrbuch der Papier und Kartonerzeugung: Autorenkollektiv, p. 11-49.
Lehrbuch der Papier und Kartonerzeugung: Autorenkollektiv, p. 317-321.
Office Action dated Jun. 5, 2015 for U.S. Appl. No. 14/238,233.
(Continued)

*Primary Examiner* — Anthony J Green
(74) *Attorney, Agent, or Firm* — Amster, Rothstein & Ebenstein LLP

(57) ABSTRACT

The present invention relates to a process for preparing self-binding pigment particles from an aqueous mineral pigment material suspension having a solid content of 45 to 80 wt.-%, based on the total weight of the suspension.

49 Claims, 1 Drawing Sheet

(56) References Cited

OTHER PUBLICATIONS

Office Action dated Jul. 7, 2014 for Chinese Application No. 201280016102.1.
English Translation of Examination Report for Taiwanese Application No. 101110693.
Office Action for Colombian Application No. 13-229479-5.
Office Action dated Nov. 3, 2014 for U.S. Appl. No. 14/005,940.
Office Action dated Feb. 12, 2015 for U.S. Appl. No. 14/005,940.
Office Action dated Jun. 1, 2015 for U.S. Appl. No. 14/005,940.
Office Action dated Sep. 15, 2015 for U.S. Appl. No. 14/005,940.
Office Action dated Aug. 25, 2015 for EP Application No. 12709889.5.
Communication from Patentee dated Jun. 10, 2015 for Opposition to EP Patent No. 2505615.
Decision by EP Patent Office dated Jun. 22, 2015 revoking EP Patent No. 2505615.
Opposition dated Feb. 9, 2015 for EP Application No. 2505615.
Paul A. Tiple Physik Heidelberg; Berlin; Oxford; Spektrum Akad. Ver., 1994.
Römpp-Lexikon Chemie Publisher Jürgen Falbe Manfred Regitz, New York; Thieme 10th edition 1996, vol. 1, keyword "Alkalicellulose", 105.
Römpp-Lexikon Chemie Publisher Jürgen Falbe Manfred Regitz, New York; Thieme 10th edition 1996, vol. 1, keywork "Cellulose", 636-638.
Römpp-Lexikon Chemie Publisher Jürgen Falbe Manfred Regitz, New York; Thieme 10th edition 1997, vol. 3 "Suspension" 4337-4338.
Römpp-Lexikon Chemie Publisher Jürgen Falbe Manfred Regitz, New York; Thieme 10th edition 1999, vol. 5 "Kolloidchemie" 2209-2213.
International Search Report dated Apr. 11, 2012 for PCT Application No. PCT/EP2012/055059.
Written Opinion of the International Searching Authority dated Apr. 11, 2012 for PCT Application No. PCT/EP2012/055059.

\* cited by examiner

PROCESS FOR PREPARING SELF-BINDING PIGMENT PARTICLES

CROSS-REFERENCE TO RELATED APPLICATIONS

This application is a U.S. national phase of PCT Application No. PCT/EP2012/055053, filed Mar. 22, 2012, which claims priority to European Application No. 11160900.4, filed Apr. 1, 2011 and U.S. Provisional Application No. 61/473,215, filed Apr. 8, 2011.

BACKGROUND OF THE INVENTION

Binders and mineral materials are among the main constituents of paints and of paper coating colours. The former, generally latex-based and in the form of aqueous suspensions or dispersions, provide the necessary adhesion to a support and cohesion between the elements forming goods to be produced, such as paint or paper but also such as agriculture fertilizer. The latter, commonly calcium carbonate, may provide improvements, for example, in paper and painting quality and agriculture properties, notably relative to its optical properties.

The concept of self-binding pigment particles is known to industry: it refers to distinct, solid particles, formed of mineral material and binder that are intimately bound to one another. The internal cohesion forces are such as to provide the self-binding pigment particles with excellent mechanical stability. Such particles may be directly implemented in a variety of applications.

Implementing self-binding pigment particles avoids the logistic difficulties of handling mineral materials and binders separately, and further avoids the unwanted physical and chemical interactions developed in comparable mixtures of minerals and binders.

Self-binding pigment particles are prepared by a process implementing at least one step of grinding mineral materials in the presence of binder, where grinding refers to an operation leading to a reduction in the particle size; the mineral materials in the self-binding pigment particle have a smaller diameter than the initial mineral material used to produce them. Such self-binding pigment particles are described in a number of documents, including WO 2006/008657, WO 2006/128814, and WO 2008/139292.

However, the processes for preparing self-binding mineral pigment particles known in the art are limited to the preparation or the co-grinding of suspensions having a low solids content. High solid content suspensions could only be processed if corresponding dispersants would be added as mentioned, e.g., in EP 1 747 252 which relates to a method for producing surface-modified inorganic fillers or pigments of a desired particle size. Said method is characterized in that filler or pigment slurries of inorganic fillers or pigments are milled to the desired particle size under the action of compressive and shear forces using polymer dispersions in combination with milling aids and/or dispersing agents.

The addition of dispersant, however, inter alia affects the adsorption of the binder to the particles during the co-grinding. The preparation of low solids content suspensions has the disadvantage that the obtained grinding product has to be up-concentrated before being shipped to other facilities for further processing. During the time and energy consuming up-concentrating step, very often an undesired loss of polymeric binder is observed, and, additionally, unwanted agglomerates are formed. Furthermore, the prior art processes often lead to a suspension having a high total organic content of the aqueous phase of the ground suspension.

In view of the foregoing, improving the self-binding pigment particle production process remains of interest to the skilled man. It would be especially desirable to provide a process for making self-binding mineral pigment particles which can be applied to mineral pigment suspensions having a high solids content, thus, avoiding an energy and time consuming up-concentrating step and, e.g., the formation of significant amounts of unwanted agglomerates.

SUMMARY OF THE INVENTION

The foregoing and other objectives are solved by the subject-matter as defined herein in the independent claims.

According to one aspect of the present invention, a process for preparing self-binding pigment particles is provided, the process comprising the following steps;
a) providing an aqueous mineral pigment material suspension;
b) providing at least one polymeric binder, wherein the binder comprises at least one carboxymethylcellulose having a degree of carboxylation in the range of 0.4 to 2.0 and having an intrinsic viscosity in the range of 3 to 300 mile;
c) mixing the binder of step b) with the aqueous mineral pigment material suspension of step a) and adjusting the solids content of the obtained suspension so that it is from 45 to 80 wt.-%, based on the total weight of the suspension;
d) grinding the aqueous mineral material suspension of step c).

The inventors of the present invention found that it is possible to prepare self-binding pigment particles directly in a high solids content suspension of the mineral pigment. This is achieved by providing in a first step an aqueous mineral pigment material suspension. Furthermore, a specific binder is provided. The binder is mixed with the aqueous mineral pigment material suspension. After adjusting the suspension to a high solids content of from 45 to 80 wt.-%, based on the total weight of the suspension, the suspension is ground in order to obtain self-binding pigment particles of desired particle size.

According to a second aspect, the present invention refers to a self-binding pigment particle suspension which is obtainable by the process according to the present invention.

Another aspect of the present invention refers to the use of the inventive self-binding pigment particle suspension in paper, plastics, paint, concrete and/or agriculture applications.

Advantageous embodiments of the inventive method are defined in the corresponding sub-claims.

DETAILED DESCRIPTION OF THE INVENTION

Figure 1:
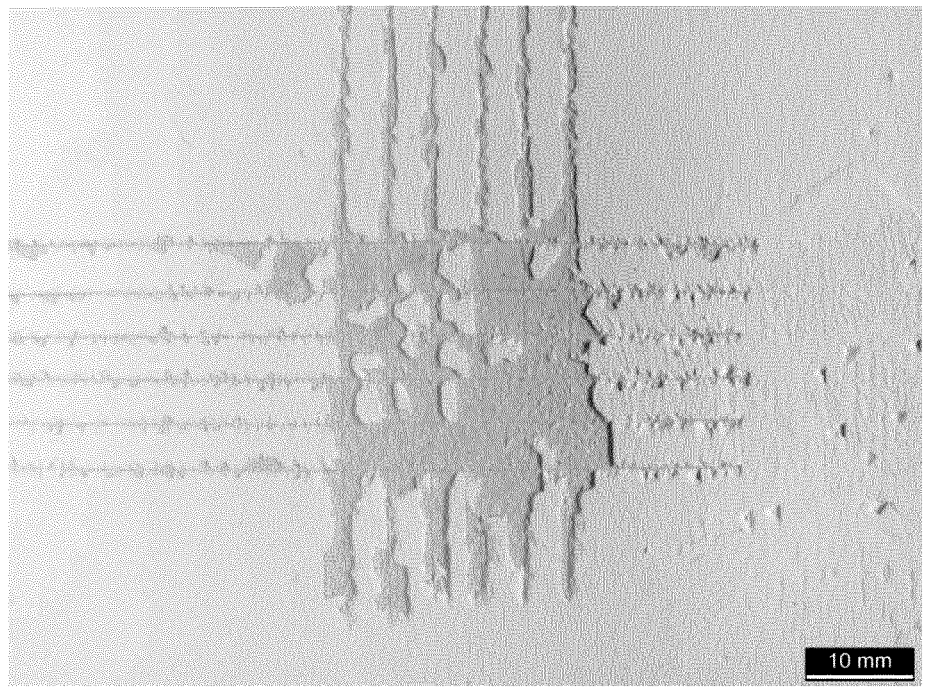
FIG. 1 is a photograph of the result obtained for the cross-cut test conducted on the pigment particles from comparative example 2.

According to one embodiment, in step c) the binder is added to the aqueous mineral pigment suspension in an amount from 0.1 to 10.0 wt.-%, preferably 0.2 to 5 wt.-%, more preferably 0.25 to 3.0 wt.-%, based on the total weight of the suspension. According to another embodiment, the binder is in form of a solution or a dry material, preferably in form of an aqueous solution having a binder concentration from 1 to 70 wt.-%, preferably from 2 to 55 wt.-%, more preferably from 5 to 50 wt.-%, and most preferably from 30 to 50 wt.-%, based on the total weight of the solution.

According to one embodiment the binder only consists of at least one carboxymethylcellulose. According to another embodiment the binder is composed of a mixture of two or more types of carboxymethylcellulose, wherein at least one has a degree of carboxylation in the range of 0.4 to 2.0 and an intrinsic viscosity in the range of 3 to 300 ml/g.

According to one embodiment the solids content is adjusted so that it is from 50 to 80 wt.-%, more preferably to 60 to 79 wt.-%, most preferably to 65 to 78 wt.%, based on the total weight of the suspension.

According to one embodiment the carboxylic, groups of the at least one carboxymethylcellulose are at least partly neutralized by adding to the aqueous mineral pigment material suspension prior or during the grinding step d) one or more polyvalent cations, wherein the polyvalent cations preferably are selected from $Sr^{2+}$, $Ca^{2+}$, or $Mg^{2+}$, and most preferably from $Ca^{2+}$ added in form of $Ca(OH)_2$ in suspension and/or solution. According to another embodiment the carboxylic groups of the at least one carboxymethylcellulose are at least partly neutralized by adding to the aqueous mineral pigment material suspension prior or during the grinding step d) one or more polyvalent cations, in situ formed, by adding an acid, preferably $H_3PO_4$, or acidic reacting salt, preferably $CaHPO_4$. According to still another embodiment the carboxylic groups of the at least one carboxymethylcellulose are at least partly neutralized by adding to the aqueous mineral pigment material suspension prior or during the grinding step d) one or more monovalent cations, wherein the monovalent cations preferably are selected from $Li^+$, $Na^+$, or $K^+$.

According to one embodiment the carboxylic groups of the at least one caboxymethylcellulose are at least partly neutralized by adding to the aqueous mineral pigment material suspension prior or during the grinding step d) a combination of one or more polyvalent cations and one or more monovalent cations, wherein the polyvalent cations preferably are selected from $Sr^{2+}$, $Ca^{2+}$, or $Mg^{2+}$, and most preferably from $Ca^{2+}$ added in form of $Ca(OH)_2$ in suspension and/or solution, and wherein the monovalent cations preferably are selected from $Li^+$, $Na^+$, or $K^+$.

According to one embodiment the grinding step d) is carried out until the fraction of self-binding pigment particles having a particle size of less than 1 µm is greater than 5 wt.-%, preferably greater than 20 wt.-%, more preferably greater than 60 wt.-%, more preferably greater than 75 wt.-%, and most preferably greater than 85 wt.-%, based on the total weight of the pigment particles. According to another embodiment before or during or after steps c) and/or d) a dispersing agent is added.

According to one embodiment said mineral pigment material is selected from calcium carbonate, calcium carbonate containing minerals, mixed carbonate based fillers, or mixtures thereof, and wherein the calcium carbonate containing minerals preferably comprise dolomite, and the mixed carbonate based fillers are preferably selected from calcium associated with magnesium, clay, talc, talc-calcium carbonate mixtures, calcium carbonate-kaolin mixtures, or mixtures of natural calcium carbonate with aluminium hydroxide, mica or with synthetic or natural fibers or co-structures of minerals, preferably talc-calcium carbonate or calcium carbonate-titanium dioxide or talc- titanium dioxide co-structures. According to one embodiment the calcium carbonate is a ground natural calcium carbonate, a precipitated calcium carbonate, a modified calcium carbonate, or a mixture thereof.

According to one embodiment the degree of carboxylation of the at least one carboxymethylcellulose is in the range of 0.4 to 2.0, 0.5 to 1.8, 0.6 to 1.6, or 0.7 to 1.5. According to another embodiment the at least one carboxymethylcellulose has a degree of carboxylation of 1 or more, and an intrinsic viscosity in the range of 5 to 250 ml/g, preferably 5 to 150 ml/g, and more preferably 10 to 100 ml/g. According to still another embodiment the at least one carboxymethylcellulose has a carboxylation degree of less than 1, and an intrinsic viscosity in the range of 5 to 70 ml/g, preferably 5 to 50 ml/g, and more preferably 10 to 30 ml/g.

According to one embodiment the intrinsic viscosity of the carboxymethylcellulose provided in step b) is adjusted by addition of at least hydrogen peroxide, optionally in presence of an alkali peroxide, in two to five steps.

According to one embodiment the grinding step d) is carried out at a temperature from 30 to 110° C., preferably from 55 to 105° C. According to another embodiment the grinding step d) is carried out in batch or continuously, preferably continuously.

According to one embodiment the self-binding pigment particle suspension is used in the wet end process of a paper machine, in cigarette paper and/or coating applications, as support for rotogravure and/or offset and/or digital printing.

According to another embodiment, the self-binding pigment particle suspension is used to reduce sun light and UV exposure of plant leaves.

The term "intrinsic viscosity" as used in the context of the present invention is a measure of the capability of a polymer in solution to enhance the viscosity of the solution and is specified in ml/g.

Throughout the present document, the "particle size" of a calcium carbonate product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ value between 0.4 and 2 µm, a Sedigraph 5100 device from the company Micromeritics, USA, can be used.

A "suspension" or "slurry" in the meaning of the present invention comprises insoluble solids and water, and optionally further additives and usually contains large amounts of solids and, thus, is more viscous and can be of higher density than the liquid from which it is formed.

The inventive process for preparing self-binding pigment particles provides several important advantages. Firstly, the inventive process provides a very good adsorption of the binder to the particle surface. Additionally, the formation of unwanted aggregates is reduced by applying the inventive process since a subsequent up-concentrating step can be avoided due to the processing of a high solids content suspension.

In the following the details and preferred embodiments of the inventive process will be set out in more detail. It is to be understood that these technical details and embodiments also apply to the inventive self-binding pigment particle suspensions and their use.

Step a)

In step a) of the process according to the present invention an aqueous mineral pigment material suspension is provided. The aqueous mineral pigment material suspension is obtained by mixing a mineral pigment material with water.

The mineral pigment material to be processed according to the inventive process may be selected from calcium carbonate, calcium carbonate containing minerals, mixed carbonate based fillers, or mixtures thereof.

According to a preferred embodiment of the present invention, the mineral pigment material is a calcium carbonate. Calcium carbonate may be a ground natural calcium carbonate, also named heavy calcium carbonate, a precipitated calcium carbonate, also named light calcium carbonate, a modified calcium carbonate, or a mixture thereof.

"Ground natural calcium carbonate" (GNCC) in the meaning of the present invention is a calcium carbonate obtained from natural sources, such as limestone, marble, calcite or chalk, and processed through a wet and/or dry treatment such as grinding, screening and/or fractionating, for example by a cyclone or classifier.

"Modified calcium carbonate" (MCC) in the meaning of the present invention may feature a natural ground or precipitated calcium carbonate with an internal structure modification or a surface-reaction product. According to a preferred embodiment of the present invention, the modified calcium carbonate is a surface-reacted calcium carbonate.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be vaterite, calcite or aragonite.

According to one embodiment of the present invention, the calcium carbonate-containing mineral comprises dolomite.

According to a preferred embodiment, the mixed carbonate based fillers are selected from calcium associated with magnesium and analogues or derivatives, various matter such as clay or talc or analogues or derivatives, and mixtures of these fillers, such as, for example, talc-calcium carbonate or calcium carbonate-kaolin mixtures, or mixtures of natural calcium carbonate with aluminium hydroxide, mica or with synthetic or natural fibers or co-structures of minerals such as talc-calcium carbonate or talc-titanium dioxide or calcium carbonate-titanium dioxide co-structures.

According to a preferred embodiment of the present invention, the aqueous mineral pigment material suspension has a solids content from 50 to 80 wt.-%, preferably from 60 to 79 wt.-%, most preferably from 65 to 78 wt.-%, based on the total weight of the suspension.

Step b)

In step b) of the process according to the present invention at least one polymeric binder is provided, wherein the binder comprises at least one carboxymethylcellulose (CMC) having a degree of carboxylation in the range of 0.4 to 2.0 and having an intrinsic viscosity in the range of 3 to 300 ml/g.

According to another embodiment of the present invention, the binder is composed of a mixture of two or more types of carboxymethylcellulose, wherein at least one has a degree of carboxylation in the range of 0.4 to 2.0 and an intrinsic viscosity the range of 3 to 300 ml/g.

According to one embodiment of the present invention, the carboxymethylcellulose has a degree of carboxylation in the range of 0.4 to 2.0, preferably of 0.5 to 1.8, more preferably of 0.6 to 1.6, and most preferably of 0.7 to 1.5.

According to another embodiment of the present invention, the intrinsic viscosity of the at least one carboxymethylcellulose is in the range of 5 to 250 ml/g, preferably 5 to 220 ml/g, and more preferably of 10 to 200 ml/g.

According to a preferred embodiment of the present invention, the at least one carboxymethylcellulose has a degree of carboxylation of 1 or more, and an intrinsic viscosity in the range of 5 to 250 ml/g, preferably 5 to 150 ml/g, and more preferably 10 to 100 ml/g.

According to another preferred embodiment of the present invention, the at least one carboxymethylcellulose has a carboxylation degree of less than 1, and an intrinsic viscosity in the range of 5 to 70 ml/g, preferably 5 to 50 ml/g, and more preferably 10 to 30 ml/g.

Carboxymethylcellulose (CMC) is a derivative of cellulose, wherein carboxymethyl groups ($-CH_2-COOH$) are bound to some of the hydroxyl groups of the repeating units of D-glucose with a 1,4-glycoside linkage, which constitute the cellulose backbone. CMC may be prepared from cellulose by reaction with monochloroacetic acid in the presence of caustic soli to form the sodium salt of carboxymethylcellulose. Each repeating D-glycose unit contains three hydroxyl groups capable of etherification, to give a maximum charge density of three carboxylic groups per monomer unit (i.e., a degree of substitution of three). The molecular weight and the intrinsic viscosity of the carboxymethylcellulose-based binder materials can be adjusted by the treatment with hydrogen peroxide ($H_2O_2$). Reference is made to DE 1 543 116 A1 describing a method for the preparation of low viscous, water-soluble CMC by oxidative degradation with $H_2O_2$ and to DE 44 11 681 A1 describing the dependency of the degradation of polysaccharide ether on the amount of oxidizing agent, temperature and duration of the treatment.

The intrinsic viscosity can be adjusted by any method that is known to the person skilled in the art, e.g., by addition of peroxides, and the degree of carboxylation of carboxymethylcellulose viscosity can be adjusted by any method that is knows to the person skilled in the art, e.g., by addition of chloroacetic acid or salts thereof In a preferred embodiment of the present invention the intrinsic viscosity is adjusted by a multiple step addition of peroxide, more preferred in two to five steps.

In a further preferred embodiment different peroxides are in use in the different steps, such as alkali peroxides, e.g., sodium peroxide in combination with hydrogen peroxide. According to an exemplary embodiment of the present invention, the peroxide for multiple step addition is a combination of hydrogen peroxide and alkali peroxide, where the amount of alkali peroxide controls the pH during the process.

According to another exemplary embodiment of the present invention, the intrinsic viscosity of the at least one carboxymethylcellulose provided in step b) is adjusted by addition of at least hydrogen peroxide, optionally in presence of an alkali peroxide, preferably in two to five steps.

According to one embodiment of the present invention, the carboxymethylcellulose employed in the process according to the present invention has a pH from 4.5 to 12, preferably from 7 to 11, and more preferably from 8.0 to 10.5.

Carboxymethylcellulose can be provided as solution or dry material, According to a preferred embodiment, the carboxymethylcellulose is in form of an aqueous solution.

According to one embodiment of the present invention, the binder is in form of an aqueous solution having a binder concentration from 1 to 70 wt.-%, preferably from 2 to 55 wt.-%, more preferably from 5 to 50 wt.-%, and most preferably from 30 to 50 wt.-%, based on the total weight of the solution. The CMC solution can be concentrated, for example, by ultrafiltration or thermal or drying. Dry CMC is preferably produced by thermal drying, more preferably by spray drying and has a solids content of more than 90, preferably from 95 to 99.9 wt.-%, based on the total weight of the CMC.

According to a preferred embodiment of the present invention, the binder only consists of at least one carboxymethylcellulose.

Step c)

In step c) of the process according to the present invention, the binder of step b) is mixed with the aqueous mineral pigment material suspension of step a). The solids content of the obtained suspension, if below 45 wt.-%, is adjusted so that it is from 45 to 80 wt.-%, based on the total weight of the suspension.

The solids content of the suspension can be adjusted by the methods known to the skilled person. To adjust the solids content of an aqueous mineral material comprising suspension, the suspension may be partially or fully dewatered by a filtration, centrifugation or evaporation process. Alternatively, water may be added to the solid mineral material (e.g. resulting from filtration) until the desired solids content is obtained.

According to a preferred embodiment of the present invention, the solids content of the suspension to be ground during step d) is adjusted so that it is from 50 to 80 wt.-%, more preferably from 60 to 79 wt.-%, most preferably from 65 to 78 wt.-%, based on the total weight of the suspension.

According to one embodiment of the present invention, in step c) the binder is added to the aqueous mineral pigment suspension in an amount from 0.1 to 10.0 wt.-%, preferably in an amount from 0.2 to 5 wt.-%, more preferably in an amount from 0.25 to 3.0 wt.%, based on the total weight of the suspension.

According to one embodiment of the present invention, the carboxylic groups of the at least one carboxymethylcellulose are at least partly neutralized by adding to the aqueous mineral pigment material suspension prior or during the grinding step d) one or more monovalent cations. Preferably, the monovalent cations are selected from $Li^+$, $Na^+$ and $K^+$. The monovalent cations may be added in the form of an aqueous solution, suspension or powder, and preferably in the form of a solution.

It was found by the inventors that the addition of polyvalent cations to the suspension provides further advantages and especially provides improved adsorption properties of the binder comprising carboxymethylcellulose to the surface of the mineral. The polyvalent cations can be added during the preparation of the CMC, the molecular weight adjustment process and/or during the grinding process according to step d). The polyvalent cations may also be produced in-situ, e.g., by addition of an acid or acidic reacting salt. The polyvalent cations may be added instead of monovalent cations or in combination with monovalent cations.

According to one embodiment, the carboxylic groups of the at least one carboxymethylcellulose are at least partly neutralized by adding to the aqueous mineral pigment material suspension prior or during the grinding step d) one or more polyvalent cations. Preferably, the multivalent cations are selected from $Sr^{2+}$, $Ca^{2+}$, or $Mg^{2+}$, and most preferably from $Ca^{2+}$ added in form of $Ca(OH)_2$ in suspension and/or solution.

The polyvalent cations can be added in an amount corresponding to 0.1 to 5 wt.-%, preferably 2 to 3 wt.-%, based on the total weight of the dry partially or fully neutralized salt of CMC. $Ca(OH)_2$ may be added in amount from 50 to 500 ppm, based on the total weight of the dry pigment solids in the aqueous mineral material suspension, preferably in an amount from 200 to 300 ppm.

The polyvalent cations may be added in the form of an aqueous solution, suspension or powder, and preferably in the faun of a suspension.

According to another embodiment of the present invention, the carboxylic groups of the at least one carboxymethylcellulose are at least partly neutralized by adding to the aqueous mineral pigment material suspension prior or during the grinding step d) one or more polyvalent cations, in situ formed, by adding an acid or acidic reacting salt. Preferably, the acid is $H_3PO_4$ or an acidic reacting salt thereof such as $Na_2HPO_4$, preferably $CaHPO_4$.

The $H_3PO_4$ or acidic reacting salt thereof may be added in amount from 50 to 500 ppm, based on the total weight of the dry pigment solids in the aqueous mineral material suspension, preferably in an amount from 200 to 400 ppm, in the form of an aqueous solution or suspension.

According to one exemplary embodiment of the present invention, the carboxylic groups of the at least one caboxymethylcellulose are at least partly neutralized by adding to the aqueous mineral pigment material suspension prior or during the grinding step d) a combination of one or more polyvalent cations and one or more monovalent cations, wherein the polyvalent cations preferably are selected from $Sr^+$, $Ca^{2+}$, or $Mg^{2+}$, and most preferably from $Ca^{2+}$ added in form of $Ca(OH)_2$ in suspension and/or solution, and wherein the monovalent cations preferably are selected from $Li^+$, $Na^+$, or $K^+$.

Step d)

In step d) of the process according to the present invention, the aqueous mineral material suspension of step c) is ground.

According to one embodiment, the aqueous environment of the suspension to be ground has a pH from 7 to 12, preferably from 8 to 11, and more preferably from 8.5 to 10.5.

The grinding process may be undertaken by all the techniques and grinders well known to the man skilled in the art for wet grinding. The grinding step may be carried out with any conventional grinding device, for example, under conditions such that refinement predominantly results from impacts with a secondary body, i.e. in one or more of: a ball mill, a rod mill, a vibrating mill, a centrifugal impact mill, a vertical bead mill, an attrition mill, or other such equipment known to the skilled person. The grinding step d) may be carried out in batch or continuously, preferably continuously.

According to one embodiment of the present invention, the grinding step d) is carried out at a temperature from 30 to 110° C., preferably from 55 to 105° C.

According to one embodiment of the present invention, the inventive process does not involve the use or addition of a dispersing agent during the grinding.

According to another embodiment of the present invention, a dispersing agent is added before, during, or after process steps c) and/or d).

According to still another, optional embodiment of the present invention, a cross-linker for carboxyl and hydroxyl groups such as ammonium zircon carbonate is added before, during, or after process steps c) and/or d).

According to one embodiment, the process of the invention may lead directly to a high solids suspension of self-binding pigment particles. Indeed, the process of the invention makes it possible to avoid a mandatory concentration step.

According to a second aspect, the present invention refers to a self-binding pigment particle suspension which is obtainable by the process according to the present invention. Such suspension contains a high solids content of self-binding mineral pigment particles, and preferably is free of stabilizing and/or dispersing agents.

The inventive self-binding pigment particle suspension preferably has a low total organic content and/or a low content of free binder in the water phase of the suspension. The total organic content and/or content of free binder in the water phase can be determined after drying at 120° C. by measuring the loss on ignition (LOI) values at 450° C.

The self-binding pigment particles obtained by the inventive process may have a $d_{50}$, value from 0.05 to 15 μm, from 0.1 to 10 μm, from 0.5 to 5, or from 0.4 to 2 μm. The $d_{50}$ value is determined using a Sedigraph 5100 for the $d_{50}$ value between 2 to 0.4 μm and Malvern Laser Mastersizer for the $d_{50}$ value between 2 and 15 μm and $d_{50}$ value between 0.05 and 0.4 μm.

According to one embodiment of the present invention, the grinding step d) is carried out until the fraction of self-binding pigment particles having a particle size of less than 1 μm is greater than 5 wt.-%, preferably greater than 20 wt.-%, more preferably greater than 60 wt.-%, more preferably greater than 75 wt.-%, and most preferably greater than 85 wt.-%, based on the total weight of the pigment particles, as measured with a Sedigraph 5100.

The improved mechanical properties reflected by a very good adhesion of the binder to the surface of the mineral particles allow for the use of the inventive self-binding pigment particles in several applications, e.g., paint applications. Also the good cohesion properties (binding effect between particles) provides beneficial properties in such applications.

According to one embodiment of the present invention the self-binding pigment particle suspension obtainable by the inventive process is used in paper, plastics, paint, concrete and/or agriculture applications. According to an exemplary embodiment of the present invention, the self-binding particle suspension obtainable by the inventive process is used in paper, e.g., in wet end process of a paper machine, preferably in cigarette paper and/or coating applications, or preferably as support for rotogravure and/or offset and/or digital printing. Another application is the coating of tree leaves and/or plant leaves to reduce sun light and UV exposure of the leave surface.

It is to be understood that the advantageous embodiments described above with respect to the inventive method for making self-binding pigment particles also can be used for preparing or defining the inventive suspension and its use. In other words, the preferred embodiments described above and any combinations of these embodiments can also be applied to the inventive suspension and its use.

The scope and interest of the invention will be better understood based on the following examples which are intended to illustrate certain embodiments of the invention and are non-limitative.

EXAMPLES

Methods and Materials

In the following, materials and measurement methods implemented in the examples are described.

Brookfield Viscosity

The Brookfield viscosity of the self-binding pigment particles suspension was measured after one hour of production and after one minute of stirring at room temperature at 100 rpm by the use of a Brookfield viscometer type RVT equipped with an appropriate spindle.

Particle Size

The particle distribution of the self-binding pigment particles was measured using a Sedigraph 5100 from the company Micromeritics, USA. The method and the instrument are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics.

Solids Content of an Aqueous Suspension

The suspension solids content (also known as "dry weight") was determined using a Moisture Analyser HR73 from the company Mettler-Toledo, Switzerland, with the following settings: temperature of 120° C. automatic switch off 3, standard drying, 5 to 20 g of suspension.

Adhesion Test

The adhesion test was carried out by determining the force necessary to separate a coating layer from a support. The ground suspensions were coated on a plastic support (PP foils) at a range of different coat weight using a laboratory coater Typ Model 624 from the company Erichsen, Germany. Polypropylene foils (YUPO Synteap foils) used in the adhesion test were obtained from the company Fischer Papier AG, Switzerland. The thickness of the white semi-matt foils was 80 μm. The coated plastic foils were dried to a moisture content below 15 wt:-%. The adhesion was measured at an altitude of 500 m over sea level at 25° C. and 50% relative humidity as follows:

20 mm of an adhesive-tape-strip (length around 30 mm, width 19 mm, scotch magic 3M 810 produced by 3M) was stuck to the coated foil, The protruding end was attached to a spring balance (precision balance, type 20100 by Pesola, measurement range 0 to 100 g). After gluing the coated foil to the ground, the spring balance was pulled vertically (angle of 90°) to the ground at a speed of around 30 cm/min wherein the deviation, i.e. the extension of the spring was measured. Adhesion of the coating to the PP-foil was determined by the weight required to induce a removal/de-bonding of the coating from the PP-foil. Values of greater than 100 g indicate that the coating did not de-bond during the measurement.

Cohesion Measurement

Cohesion measurement was carried out to determine the force necessary to separate pigment particles from each other. In order to study the self-binding character of the obtained pigment particles, tablets were prepared using a membrane filtration process. A high-pressure filter press type was used, manufactured from a hollow steel tube. Said tube was closable at the top by a lid having a pressure tube entry and contained the filtration membrane at the bottom. A volume of 50 to 80 ml of a slurry was then introduced, wherein the slurry was either a suspension containing only the inorganic matter (which is used to manufacture the reference samples), or a suspension containing the self-binding particles according to the invention (which is used to manufacture the samples for testing). Upon closing the lid, a constant pressure of 15 bar was then applied via the pressure tube to eliminate the water until a 20 mm thick tablet was obtained The obtained tablet was air-dried for 1 week. A detailed description of the device and method used can be found in "Modified calcium carbonate coatings with rapid absorption and extensive liquid update capacity" (Colloids and Surfaces A, 236 (1-3), 2003, pp. 91-102).

The quasi-cylindrical solid blocks of pigment particles were ground using a disk mill (Jean Wirtz, Phoenix 4000) into disk-shaped samples having a diameter of 25 mm and a thickness of approximate 15 mm. A detailed description of this procedure can be found in "Fluid transport into porous coating structures: some novel findings" (Tappi Journal, 83 (5), 2000, pp. 77-78).

The obtained samples underwent a crush resistance test on a Zwick-Roell tension machine with a WN158988 control unit, using a rod/flat system (with a hemispherical end). The force of the cell was 20 kN. The samples were crushed at a speed of 3 mm/min over a length of 10 mm. The values of the force for a deformation of 2 mm were determined.

Intrinsic Viscosity

The intrinsic viscosity was determined by a Schott AVS 370 system. The samples were dissolved in a 0.2 M NaCl solution, and subsequently, the pH was adjusted to 10 with NaOH. Measurements were performed at 25° C. with a capillary type 0a and corrected using the Hagenbach correction.

Degree of Carboxylation

The degree of carboxylation was determined by conductometric titration according to Katz et al. "The determination of strong and weak acidic groups in sulfite pulps" (Svensk Paperstidn., 1984, 6, pp. 48-53).

Cross Cut Test

The cross cut test was carried out in accordance with DIN EN ISO 2409:2007 using a NT cartridge-A cutter (blade thickness: 0.38 mm), wherein the distance between the cuts was 2 mm. The sample was prepared by coating a stone ware plate with a wet volumetric coating of 35 ml/m2 and drying the same in a hot air stream at 150° C. for 15 min.

Whiteness R457) and Yellowness Indix Measurement

Whiteness and yellowness index was determined according to norm TAPPI T452 ISO 247. Glossiness was determined according to DIN 54 502/TAPPI 75.

Preparation of a Mineral Slurry and Grinding

Dry ground calcium carbonate blend, having a $d_{90}$ of 390 μm a $d_{50}$ of 165 μm, a $d_{10}$ of 20 μm (determined by screening) was wet ground to a $d_{50}$ of approximately of 0.7 μm, The wet grinding was done in tap water (15° dH) in a vertical attritor mill (Dynomill®, Bachofen, Switzerland) having a volume of 1.5 litres in a recirculation mode, using zircon silicate beads of 0.6 to 1.2 mm diameter.

Example 1

Comparative Example

A natural $CaCO_3$ from Italy, Avenza, was employed as mineral pigment material, and a commercially available carboxymethylcellulose (CMC) (from ACROS Organics) was employed as polymeric binder. The CMC used had an $M_w$ of 250000 g/mol, a carboxylation degree of 1.2, and an intrinsic viscosity of 774 ml/g.

A slurry with a solid content of 45 wt.-% was prepared by adding 2 wt.-% of the CMC in form of a 9.9 wt.-% solution in water to the mineral pigment material suspension and wet grinding the mixture until a $d_{98}$ of 3 μm was achieved.

The particle size distribution, measured on a Sedigraph 5100, had a fraction of 92 wt.-% smaller than 2 μm and 64 wt.-% smaller than 1 μm. During the grinding process, the Brookfield viscosity increased to such an extent so that no further grinding at the high solids content concentration was possible. The slurry was diluted with water to keep grinding running. The obtained pigment particle suspension had a solid content of 40.5 wt.-% and a Brookfield viscosity of 485 mPas.

Example 2

Comparative Example

A natural $CaCO_3$ from Norway having a fineness corresponding to a $d_{50}$ value of 42 to 48 μm was employed as mineral pigment material, and a commercially available sodium/magnesium-neutralized polyacrylate having an $M_w$ of 6000 g/mol and a $M_n$ of 2300 g/mol was employed as polymeric binder.

A slurry with a solid content of 77.5 wt.-% was prepared by adding 0.65 wt.-% of the sodium/magnesium-neutralized polyacrylate to the mineral pigment material suspension and wet grinding the mixture in a 1.4-litre vertical atritor mill by recirculation until a $d_{50}$ value of 0.8 μm was achieved.

The particle size distribution, measured on a Sedigraph 5100, had a fraction of 90 wt.-% smaller than 2 μm, 65 wt.-% smaller than 1 μm, and 15 wt.-% smaller than 0.2 μm.

The adhesion test revealed that a coating of the obtained product was released from or ripped off the foil at less than 10 g.

The cohesion test provided a tablet breaking strength of 256 N±100.

Example 3

Preparation of Carboxymethylcellulose (CMC) Binder 214 g commercially available CMC (from ACROS Organics) having an $M_w$ of 250000 g/mol, a carboxylation degree of 1.2, and an intrinsic viscosity of 774 ml/g, was dissolved in 2460 ml water and stirred for 12 h at room temperature. Subsequently, the solution was heated to 80° C., and 800 μl of a 30 wt.-% $H_2O_2$ solution were added dropwise. After 5 h, 60 μl of said $H_2O_2$ solution were added dropwise. Thereafter, 2 times another 60 μl of said $H_2O_2$ solution were added dropwise in 1.5 h intervals. Finally, the solution was stirred for another 1.5 h at 80° C. The obtained CMC binder had an intrinsic viscosity of 179 ml/g and a pH of 7.

Preparation of Self-Binding Pigment Particles

A natural $CaCO_3$ from Italy, Avenza, was employed as mineral pigment material.

A slurry with a solid content of 60 wt.-% was prepared by adding 2 wt.-% of the prepared CMC binder in form of a 9.9 wt.-% solution in water to the mineral pigment material suspension and wet grinding the mixture at 55° C. Furthermore, 300 ppm of $Ca(OH)_2$ were added during grinding. The grinding was carried out for 25 min until a $d_{98}$ of 3 μm was achieved.

The particle size distribution, measured on a Sedigraph 5100, had a fraction of 91 wt.-% smaller than 2 μm and 61 wt.-% smaller than 1 μm. The obtained pigment particle suspension had a solid content of 60.8 wt.-%, a pH of 9.4, and a Brookfield viscosity of 922 mPas.

Adhesion, Cohesion and Cross-Cut Tests

The adhesion test was carried out with coating weights of 5 g/m², 21 g/m², and 47 g/m². The coatings did not release or rip off the foil (de-bond) even when pulling with a balance force of 100 g.

The cohesion test provided a tablet breaking strength of 1583 N. This test has been reproduced three times with a deviation of ±250 N.

Figure 2:
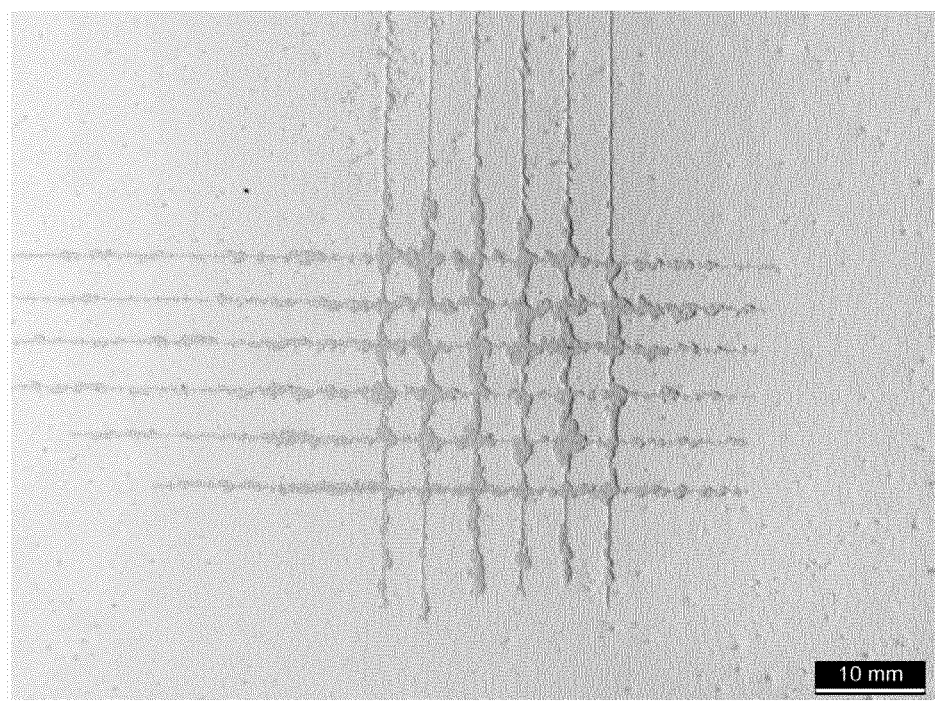
FIG. 2 is a photograph of the result obtained for the cross-cut test conducted on the self-binding particles from example 3.

The cross-cut test was carried out on stone ware plate (unglazed, size: 15×15 cm², "Villeroy & Boch", Germany). Table 1 show the results obtained for the self-binding pigment particles obtained by the inventive process and pigment particles of the prior art. A photograph of the result obtained for the comparative example 2 is shown in FIG. 1 and a photograph of the result obtained for self-binding particles of example 3 is shown in FIG. 2.

TABLE 1

| Sample | Cross-cut test (EN ISO 2409:2007) (Grading ISO) |
|---|---|
| Pigment example 2 (comparative) | GT 5 |
| Pigment example 3 | GT 2 |

According to EN ISO 2409:2007 the grading GT 2 means that the coating is chipped off along the edges of the cut and/or at the intersections of the grid lines, and the chipped off surface is about 15% of the sections. GT5 refers to each degree of flaken that cannot be even classified by GT 4, wherein GT 4 is used when the coating is chipped off along edges of the cut in broad strips and/or of individual sections totally or partly, and the chipped region of surface is about 65% of the sections.

The results compiled in table 1 show that the inventive product of example 3 leads to an improved adhesion on totally different supports such as plastic or stone ware compared to the product of comparative example 2.

Example 4

Preparation of Self-Binding Pigment Particles

A natural $CaCO_3$ from Italy, Avenza, was employed as mineral pigment material.

A slurry with a solid content of 60 wt.-% was prepared by adding 2 wt.-% of a CMC binder prepared according Example 3 in form of a 9.9 wt.-% solution in water to the mineral pigment material suspension. Furthermore, 300 ppm of $Ca(OH)_2$ and 500 ppm ammonium zirconium carbonate (Bacote 20, MEL Chemicals) were added during grinding. The grinding was carried out for 25 min until a $d_{98}$ of 3 μm was achieved.

The particle size distribution, measured on a Sedigraph 5100, had a fraction of 91 wt.-% smaller than 2 μm and 61 wt.-% smaller than 1 μm. The obtained pigment particle suspension had a solid content of 61 wt.-%, a pH of 9.5, and a Brookfield viscosity of 940 mPas.

Coating on Wood

A balsa wood plate (ex Costa Rica) was coated with the self binding pigment prepared above. The wet volumetric coating was 35 ml/m² and the wood sample was dried in a hot air stream at 150° C.

Adhesion Test

The coatings did not release or rip off (de-bond from) the wood support even pulling with a balance force of 100 g.

Optical Properties

TABLE 2

| Sample | Whitness (R457) | Yellowness index |
|---|---|---|
| Uncoated wood | 46.8 | 34.9 |
| Coated wood | 82.1 | 3.4 |

The results compiled in table 2 show that the inventive self-binding pigment prepared in example 4 can be used to modify the optical surface properties of a wood surface.

Example 5

Preparation of Self-Binding Pigment Particles

A natural $CaCO_3$ from Italy, Avenza, was employed as mineral pigment material.

A slurry with a solid content of 50 wt.-% was prepared by adding 0.72 wt.-% of a CMC binder prepared according Example 3 in form of a 9.6 wt.-% solution in water to the mineral pigment material suspension. Additionally, 1.28 wt.-% of a commercially available CMC (from ACROS Organics) having an $M_w$ of 250000 g/mol, a carboxylation degree of 1.2, and an intrinsic viscosity of 774 ml/g, was added in form of a 9.9 wt.-% solution in water. Furthermore, 300 ppm of $Ca(OH)_2$ was added during grinding. The grinding was carried out for 25 min at 50° C. until a $d_{98}$ of 3 μm was achieved.

The particle size distribution, measured on a Sedigraph 5100, had a fraction of 89 wt.-% smaller than 2 μm and 60 wt.-% smaller than 1 μm. The obtained pigment particle suspension had a solid content of 51.5 wt.-%, a pH of 9.2, and a Brookfield viscosity of 954 mPas.

Adhesion and Cohesion Test

The adhesion test was carried out with coating weights of 7 g/m², 15 g/m², and 40 g/m². The coatings did not release or rip off (de-bond from) the foil even when pulling with a balance force of 100 g.

The cohesion test provided a tablet breaking strength of 1659 N.

The obtained results for comparative examples 1 and 2 as well as for examples 3 and 5 are summarized in Table 3 below.

TABLE 3

| | solids content [wt.-%] | binder [wt.-%] | $Ca(OH)_2$ [ppm] | Brookfield viscosity [mPas] | cohesion [N] |
|---|---|---|---|---|---|
| Example 1 (comparative) | 40.5 | 2.00 wt.-% CMC (commercial) | | >2000 | |
| Example 2 (comparative) | 77.5 | 0.65 wt.-% sodium/magnesium polyacrylate | | | 256 ± 100 |
| Example 3 | 60.0 | 2.00 wt.-% CMC (inventive) | 300 | 922 | 1583 ± 250 |
| Example 5 | 50.0 | Blend of 0.72 wt.-% CMC (inventive) and 1.28 wt.-% CMC (commercial) | 300 | 954 | 1659 |

A clear advantageous effect can be gathered from the results shown in table 3 since a reduced viscosity in combination with increased solid content is observed. Contrary to comparative example 1, in examples 3 and 5, the grinding of the slurry is still possible even at higher solid contents. Comparative example 2 shows the use of polyacrylate instead of CMC. Polyacrylate is known to a person skilled in the art as a polymer which allows for grinding at high solids content. However, it does not provide the desired cohesion and adhesion properties. As can be seen in table 3, the cohesion measurements merely indicate values of 265 N for comparative example 2 but 1583 N for example 3 and 1659 N for example 5. Therefore, the inventive CMC provides much better results than comparative example 2.

Example 6

Preparation of Carboxymethylcellulose (CMC) Binder 90.8 g commercially available CMC (from (ACROS Organics) having an $M_w$ of 250000 g/mol, a carboxylation degree of 1.2, and an intrinsic viscosity of 774 ml/g, was dissolved in 1 170 ml water and stirred for 12 h at room temperature. Subsequently, the solution was heated to 80° C., and 0.9 ml of a 30 wt.-% $H_2O_2$ solution were added dropwise. After 5.5 h, 0.5 ml of said $H_2O_2$ solution were added dropwise. After 4 h, another 0.2 ml of said $H_2O_2$ solution were added dropwise. Thereafter, the solution was stirred for 2 h and another 0.4 ml of said $H_2O_2$ solution were added drop wise. Finally, the solution was stirred for another 4 h at 80° C. The obtained CMC binder had an intrinsic viscosity of 56 ml/g and a pH of 10, adjusted with aqueous 10% NaOH.

Preparation of Self-Binding Pigment Particles

A natural $CaCO_3$ from Norway obtained by first autogenously dry grinding 10 to 300 mm $CaCO_3$ rocks to a fineness corresponding to a $d_{50}$ value from 42 to 48 μm was employed as mineral pigment material.

A slurry with a solid content of 72.1 wt.-% was prepared by adding 0.69 wt.-% of the prepared CMC and 300 ppm $Ca(OH)_2$ to the mineral pigment material suspension and wet grinding the mixture in a 1.4-litre vertical atritor mill by recirculation until a $d_{50}$ value of 0.8 μm was achieved.

The particle size distribution, measured on a Sedigraph 5100, had a fraction of 90 wt.-% smaller than 2 μm, 65 wt.-% smaller than 1 μm, and 15 wt.-% smaller than 0.2 μm. The obtained pigment particle suspension had a solid content of 72.1 wt.-%, a pH of 9.6, and a Brookfield viscosity of 273 mPas.

Adhesion Test

The adhesion test was carried out with coating weights of 10 g/m², and 35 g/m². The coatings did not release or rip off (de-bond from) the foil even when pulling with a balance force of 100 g for a coating weight of 10 g/m², and the coatings did not release or rip off (de-bond from) the foil when pulling with a balance force of 35 g for a coating weight of 35 g/m².

Example 7

Preparation of Carboxymethylcellulose (CMC) Binder 124 g commercially available CMC (from ACROS Organics) having an $M_w$ of 250000 g/mol, a carboxylation degree of 1.2, and an intrinsic viscosity of 774 ml/g, was dissolved in 1299 ml water and stirred for 12 h at room temperature. Subsequently, the solution was heated to 80° C., and 2 ml of a 30 wt.-% $H_2O_2$ solution were added dropwise over a period of 20 minutes. After 4.5 h, 1.2 ml of said $H_2O_2$ solution were added dropwise over a period of 20 minutes. After 2 h additional 0.8 ml of said $H_2O_2$ solution were added drop wise over a period of 20 minutes. Thereafter, the solution was stirred for 7 h at 80° C. After cooling down to room temperature, the obtained CMC binder had an intrinsic viscosity of 23.7 ml/g and a pH of 10, adjusted with aqueous 10% NaOH.

Preparation of Self-Binding Pigment Particles

A natural $CaCO_3$ from Norway obtained by first autogenously dry grinding 10 to 300 mm $CaCO_3$ rocks to a fineness corresponding to a $d_{50}$ value from 42 to 48 μm was employed as mineral pigment material.

A slurry with a solid content of 73.8 wt.-% was prepared by adding 0.58 wt.-% of the prepared CMC to the mineral pigment material suspension and wet grinding the mixture in a 1.4-litre vertical atritor mill by recirculation until a $d_{50}$ value of 0.8 μm was achieved.

The particle size distribution, measured on a Sedigraph 5100, had a fraction of 90 wt.-% smaller than 2 μm, 65 wt.-% smaller than 1 μm, and 15 wt.-% smaller than 0.2 μm. The obtained pigment particle suspension had a solid content of 73.8 wt.-%, a pH of 8.4, and a Brookfield viscosity of 292 mPas.

Adhesion Test

The adhesion test was carried out with coating weights of 14 g/m². The coatings did not release or rip off (de-bond from) the foil until a balance force of 40 g.

Example 8

Preparation of Carboxymethylcellulose (CMC) Binder 93 g commercially available CMC (from ACROS Organics) having an $M_w$ of 250000 g/mol, a carboxylation degree of 1.2, and an intrinsic viscosity of 774 ml/g, was dissolved in 2255 ml water and stirred for 12 h at room temperature. Subsequently, the solution was heated to 80° C., and 0.34 ml of a 30 wt.-% $H_2O_2$ solution were added dropwise over a period of 20 minutes. After 3 h, 27 μl of said $H_2O_2$ solution were added. Finally, the solution was stirred for 2.5 h at 80° C., The obtained CMC binder had an intrinsic viscosity of 178 ml/g and a pH of 10, adjusted with aqueous 10% NaOH after cooling to room temperature.

Preparation of Self-Binding Pigment Particles

A natural $CaCO_3$ from Norway obtained by first autogenously thy grinding 10 to 300 mm $CaCO_3$ rocks to a fineness corresponding to a $d_{50}$ value from 42 to 48 μm was employed as mineral pigment material.

A slurry with a solid content of 68.2 wt.-% was prepared by adding 0.93 wt.-% of the prepared CMC and 300 ppm $Ca(OH)_2$ to the mineral pigment material suspension and wet grinding the mixture in a 1.4-litre vertical atritor mill by recirculation until a $d_{50}$ value of 0.8 μm was achieved.

The particle size distribution, measured on a Sedigraph 5100, had a fraction of 90 wt.-% smaller than 2 μm, 65 wt.-% smaller than 1 μm, and 15 wt.-% smaller than 0.2 μm. The obtained pigment particle suspension had a solid content of 68.2 wt.-%, a pH of 9.5, and a Brookfield viscosity of 1016 mPas.

Adhesion Test

The adhesion test was carried out with coating weights of 7 g/m², 26 g/m², and 48 g/m². The coatings did not release or rip off the foil even when pulling with a balance force of 100 g for coating weights of 7 g/m² and 26 g/m². The coatings did not release or rip off (de-bond from) the foil until a balance force of 90 g for the coating weight of 48 g/m².

The obtained results for examples 6 to 8 are summarized in table 4 below.

TABLE 4

| | solids content [wt.-%] | CMC-binder [wt.-%] | Ca(OH)$_2$ [ppm] | Brookfield viscosity [mPas] |
|---|---|---|---|---|
| Example 6 | 72.1 | 0.69 | 300 | 273 |
| Example 7 | 73.8 | 0.58 | 0 | 292 |
| Example 8 | 68.2 | 0.93 | 300 | 1016 |

Example 9

Preparation of Carboxymethylcellulose (CMC) Binder 3.4 kg commercially available CMC (from ACROS Organics) having an M$_w$ of 250000 g/mol, a carboxylation degree of 1.2, and an intrinsic viscosity of 774 ml/g, was dissolved in 40 L water and stirred for 24 h at room temperature. Subsequently, the solution was heated to 80° C., and 150 ml of a 30 wt.-% H$_2$O$_2$ solution were added dropwise over a period of 2 h. After 22 h, additional 20 ml H$_2$O$_2$ solution were added over a period of 2 h. Finally, the solution was stirred for 8 h at 80° C. The obtained CMC binder had an intrinsic viscosity of 28 ml/g and a pH of 10, adjusted with aqueous 10% NaOH after cooling to room temperature. The CMC solution was spray dried.

Preparation of Self-Binding Pigment Particles

A natural CaCO$_3$ from Norway obtained by first autogenously dry grinding 10 to 300 mm CaCO$_3$ rocks to a fineness corresponding to a d$_{50}$ value from 42 to 48 μm was employed as mineral pigment material.

A slurry with a solid content of 76.1 wt.-% was prepared by adding 0.73 wt.-% of the prepared CMC and 0.03 wt.-% H$_3$PO$_4$ to the mineral pigment material suspension and wet grinding the mixture in a 1.4-litre vertical atritor mill by recirculation at 60° C. until a d$_{50}$ value of 0.8 μm was achieved.

The particle size distribution, measured on a Sedigraph 5100, had a fraction of 90 wt.-% smaller than 2 μm, 65 wt.-% smaller than 1 μm, and 15 wt.-% smaller than 0.2 μm. The obtained pigment particle suspension had a solid content of 76.0 wt.-%, a pH of 8.7, and a Brookfield viscosity of 482 mPas.

Adhesion Test

The adhesion test was carried out with coating weights of 15 g/m$^2$. The coatings did not release or rip off (de-bond from) the foil even when pulling with a balance force of 100 g.

Optical Properties

TABLE 5

| Sample | Gloss (Tappi 75) [%] |
|---|---|
| Uncoated polypropylene foil (YUPO Synteape foils) | 15.5 |
| Polypropylene foil (YUPO Synteape foils) coated with 15 g/m$^2$ of a slurry of self-binding pigment particles of example 9 | 73.1 |

The obtained results of the adhesion test for examples 2, 3, and 5 to 8 are summarized in table 6 below.

TABLE 6

| | Coating weight [g/m$^2$] | applied weight [g] | observations | Mechanical Properties |
|---|---|---|---|---|
| Example 2 (comparative) | — | <10 | coating peels off | − |

TABLE 6-continued

| | Coating weight [g/m$^2$] | applied weight [g] | observations | Mechanical Properties |
|---|---|---|---|---|
| Example 3 | 5 | >100 | no peel off | + |
| | 21 | >100 | no peel off | + |
| | 47 | >100 | no peel off | + |
| Example 5 | 7 | >100 | no peel off | + |
| | 15 | >100 | no peel off | + |
| | 40 | >100 | no peel off | + |
| Example 6 | 10 | 100 | no peel off | + |
| | 35 | 35 | no peel off | + |
| Example 7 | 14 | 40 | no peel off | + |
| Example 8 | 7 | >100 | no peel off | + |
| | 26 | >100 | no peel off | + |
| | 48 | 90 | no peel off | + |

Measurements of the adhesion and the mechanical properties were done after drying the coating layer. As can be gathered from table 6, the coatings of the inventive self-binding pigment particles did not rip off or peel off even at higher weights or stronger bending. A peeling off was only observed for the coating of comparative example 2.

The invention claimed is:

1. A process for preparing self-binding pigment particles comprising the following steps:
   a) providing an aqueous mineral pigment material suspension, wherein the mineral pigment comprises calcium carbonate;
   b) providing at least one polymeric binder, wherein the binder comprises at least one carboxymethylcellulose having a degree of carboxylation in the range of 0.4 to 2.0 and having an intrinsic viscosity in the range of 3 to 300 ml/g;
   c) mixing the binder of step b) with the aqueous mineral pigment material suspension of step a) so that binder is present in the suspension in an amount from 0.1 to 10.0 wt.-% and the resulting suspension has a solids content of from 45 to 80 wt.-%, based on the total weight of the suspension; and
   d) grinding the resulting suspension of step c) to obtain a suspension of self-binding pigment particles.

2. The process according to claim 1, wherein in step c) the binder is present the suspension in an amount from 0.2 to 5 wt.-%, based on the total weight of the suspension.

3. The process according to claim 1, wherein in step c) the binder is present in the suspension in an amount from 0.25 to 3 wt.-%, based on the total weight of the suspension.

4. The process according to claim 1, wherein the binder is in a form of a solution or a dry material.

5. The process according to claim 1, wherein the binder is in a form of an aqueous solution having a binder concentration from 1 to 70 wt.-%, based on the total weight of the solution.

6. The process according to claim 1, wherein the binder is in a form of an aqueous solution having a binder concentration from 2 to 55 wt.-%, based on the total weight of the solution.

7. The process according to claim 1, wherein the binder is in a form of an aqueous solution having a binder concentration from 5 to 50 wt.-%, based on the total weight of the solution.

8. The process according to claim 1, wherein the binder is in a form of an aqueous solution having a binder concentration from 30 to 50 wt.-%, based on the total weight of the solution.

9. The process according to claim 1, wherein the binder consists of at least one carboxymethylcellulose.

10. The process according to claim 1, wherein the binder is composed of a mixture of two or more types of carboxymethylcellulose, wherein at least one has a degree of carboxylation in the range of 0.4 to 2.0 and an intrinsic viscosity in the range of 3 to 300 ml/g.

11. The process according to claim 1, wherein in step c) the solids content of the resulting suspension is from 50 to 80 wt.-%, based on the total weight of the suspension.

12. The process according to claim 1, wherein in step c) the solids content of the resulting suspension is from 60 to 79 wt.-%, based on the total weight of the suspension.

13. The process according to claim 1, wherein in step c) the solids content of the resulting suspension is from 65 to 78 wt.-%, based on the total weight of the suspension.

14. The process according to claim 1, wherein the carboxylic groups of the at least one carboxymethylcellulose are at least partly neutralized by adding to the aqueous mineral pigment material suspension prior or during the grinding step d) one or more polyvalent cations, wherein the polyvalent cations are selected from the group consisting of $Sr^{2+}$, $Ca^{2+}$ and $Mg^{2+}$.

15. The process according to claim 1, wherein the carboxylic groups of the at least one carboxymethylcellulose are at least partly neutralized by adding to the aqueous mineral pigment material suspension prior or during the grinding step d) one or more polyvalent cations, wherein the polyvalent cations are $Ca^{2+}$, added in form of $Ca(OH)_2$ in suspension and/or solution.

16. The process according to claim 1, wherein the carboxylic groups of the at least one carboxymethylcellulose are at least partly neutralized by adding to the aqueous mineral pigment material suspension prior or during the grinding step d) one or more polyvalent cations, in situ formed, by adding an acid or acid reacting salt.

17. The process according to claim 1, wherein the carboxylic groups of the at least one carboxymethylcellulose are at least partly neutralized by adding to the aqueous mineral pigment material suspension prior or during the grinding step d) one or more polyvalent cations, in situ formed, by adding $H_3PO_4$, $Na_2HPO_4$, or $CaHPO_4$.

18. The process according to claim 1, wherein the carboxylic groups of the at least one carboxymethylcellulose are at least partly neutralized by adding to the aqueous mineral pigment material suspension prior or during the grinding step d) one or more monovalent cations selected from the group consisting of $Li^+$, $Na^+$ and $K^+$.

19. The process according claim 1, wherein the carboxylic groups of the at least one caboxymethylcellulose are at least partly neutralized by adding to the aqueous mineral pigment material suspension prior or during the grinding step d) a combination of one or more polyvalent cations and one or more monovalent cations, wherein the polyvalent cations are selected from the group consisting of $Sr^{2+}$, $Ca^{2+}$ and $Mg^{2+}$, and wherein the monovalent cations are selected from the group consisting of $Li^+$, $Na^+$ and $K^+$.

20. The process according claim 1, wherein the carboxylic groups of the at least one caboxymethylcellulose are at least partly neutralized by adding to the aqueous mineral pigment material suspension prior or during the grinding step d) a combination of one or more polyvalent cations and one or more monovalent cations, wherein the polyvalent cations are $Ca^{2+}$ added in form of $Ca(OH)_2$ in suspension and/or solution, and wherein the monovalent cations are selected from the group consisting of $Li^+$, $Na^+$ and $K^+$.

21. The process according to claim 1, wherein the grinding step d) is carried out until the fraction of self-binding pigment particles having a particle size of less than 1 μm is greater than 5 wt.-%, based on the total weight of the pigment particles.

22. The process according to claim 1, wherein the grinding step d) is carried out until the fraction of self-binding pigment particles having a particle size of less than 1 μm is greater than 20 wt.-%, based on the total weight of the pigment particles.

23. The process according to claim 1, wherein the grinding step d) is carried out until the fraction of self-binding pigment particles having a particle size of less than 1 μm is greater than 60 wt.-%, based on the total weight of the pigment particles.

24. The process according to claim 1, wherein the grinding step d) is carried out until the fraction of self-binding pigment particles having a particle size of less than 1 μm is greater than 75 wt.-%, based on the total weight of the pigment particles.

25. The process according to claim 1, wherein the grinding step d) is carried out until the fraction of self-binding pigment particles having a particle size of less than 1 μm is greater than 85 wt.-%, based on the total weight of the pigment particles.

26. The process according to claim 1, wherein before or during or after steps c) and/or d) a dispersing agent is added.

27. The process according to claim 1, wherein the mineral pigment material is calcium carbonate, or calcium carbonate and one or more of dolomite, magnesium, clay talc, kaolin, aluminium hydroxide, mica, titanium dioxide, synthetic fibers and natural fibers.

28. The process according to claim 1, wherein mineral pigment material is a ground natural calcium carbonate, a precipitated calcium carbonate, a modified calcium carbonate, or any mixture thereof.

29. The process according to claim 1, wherein the degree of carboxylation of the at least one carboxymethylcellulose is in the range of 0.4 to 2.0.

30. The process according to claim 1, wherein the degree of carboxylation of the at least one carboxymethylcellulose is in the range of 0.5 to 1.8.

31. The process according to claim 1, wherein the degree of carboxylation of the at least one carboxymethylcellulose is in the range of 0.6 to 1.6.

32. The process according to claim 1, wherein the degree of carboxylation of the at least one carboxymethylcellulose is in the range of 0.7 to 1.7.

33. The process according to claim 1, wherein the intrinsic viscosity of the at least one carboxymethylcellulose is in the range of 5 to 250 ml/g.

34. The process according to claim 1, wherein the intrinsic viscosity of the at least one carboxymethylcellulose is in the range of 5 to 220 ml/g.

35. The process according to claim 1, wherein the intrinsic viscosity of the at least one carboxymethylcellulose is in the range of 10 to 200 ml/g.

36. The process according to claim 1, wherein the at least one carboxymethylcellulose has a degree of carboxylation of 1 or more, and an intrinsic viscosity in the range of 5 to 250 ml/g.

37. The process according to claim 1, wherein the at least one carboxymethylcellulose has a degree of carboxylation of 1 or more, and an intrinsic viscosity in the range of 5 to 150 ml/g.

38. The process according to claim 1, wherein the at least one carboxymethylcellulose has a degree of carboxylation of 1 or more, and an intrinsic viscosity in the range of 10 to 100 ml/g.

39. The process according to claim 1, wherein the at least one carboxymethylcellulose has a carboxylation degree of less than 1, and an intrinsic viscosity in the range of 5 to 70 ml/g.

40. The process according to claim 1, wherein the at least one carboxymethylcellulose has a carboxylation degree of less than 1, and an intrinsic viscosity in the range of 5 to 50 ml/g.

41. The process according to claim 1, wherein the at least one carboxymethylcellulose has a carboxylation degree of less than 1, and an intrinsic viscosity in the range of 10 to 30 ml/g.

42. The process according to claim 1, wherein the intrinsic viscosity of the carboxymethylcellulose provided in step b) is adjusted by addition of at least hydrogen peroxide, optionally in presence of an alkali peroxide, in two to five steps.

43. The process according to claim 1, wherein the grinding step d) is carried out at a temperature from 30 to 110° C.

44. The process according to claim 1, wherein the grinding step d) is carried out at a temperature from 55 to 105° C.

45. The process according to claim 1, wherein the grinding step d) is carried out in batch or continuously.

46. A self-binding pigment particle suspension obtained by the process of claim 1.

47. Paper, plastic, paint, concrete and/or an agriculture product comprising the self-binding pigment particle suspension of claim 46.

48. Paper comprising the self-binding pigment particle suspension according to claim 47.

49. An agriculture product comprising the self-binding pigment particle suspension according to claim 46.

* * * * *